(12) United States Patent
Yan

(10) Patent No.: US 10,146,426 B2
(45) Date of Patent: Dec. 4, 2018

(54) APPARATUS AND METHOD FOR USER INPUT FOR CONTROLLING DISPLAYED INFORMATION

(75) Inventor: Qifeng Yan, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 12/942,463

(22) Filed: Nov. 9, 2010

(65) Prior Publication Data

US 2012/0113018 A1    May 10, 2012

(51) Int. Cl.
*G06F 3/041*   (2006.01)
*G06F 3/0488*  (2013.01)

(52) U.S. Cl.
CPC ................. *G06F 3/04883* (2013.01)

(58) Field of Classification Search
None
See application file for complete search history.

(56) References Cited

U.S. PATENT DOCUMENTS

| | | | |
|---|---|---|---|
| 5,084,763 A | | 1/1992 | Naradate et al. |
| 5,717,415 A | | 2/1998 | Iue et al. |
| 5,736,974 A | * | 4/1998 | Selker ........................ 715/862 |
| 7,636,088 B2 | * | 12/2009 | Nomura et al. .............. 345/419 |
| 7,880,726 B2 | * | 2/2011 | Nakadaira et al. .......... 345/173 |
| 8,427,445 B2 | * | 4/2013 | Kennedy ..................... 345/173 |
| 8,570,278 B2 | * | 10/2013 | Kocienda et al. ........... 345/173 |
| 9,582,144 B2 | * | 2/2017 | Deluca ................ G06F 3/04815 |
| 2001/0028350 A1 | * | 10/2001 | Matsuoka et al. ........... 345/427 |
| 2005/0088516 A1 | | 4/2005 | Song et al. |
| 2006/0161871 A1 | | 7/2006 | Hotelling et al. |
| 2007/0008313 A1 | * | 1/2007 | Song et al. ................... 345/419 |
| 2007/0198950 A1 | * | 8/2007 | Dodge et al. ................. 715/815 |
| 2007/0279391 A1 | * | 12/2007 | Marttila et al. .............. 345/169 |
| 2008/0225007 A1 | * | 9/2008 | Nakadaira ........... G06F 3/04815 345/173 |
| 2008/0288895 A1 | * | 11/2008 | Hollemans et al. .......... 715/863 |

(Continued)

FOREIGN PATENT DOCUMENTS

CN    1893673 A    1/2007
CN    101828161 A    9/2010

(Continued)

OTHER PUBLICATIONS

International Search Report and Written Opinion for International Application No. PCT/FI2011/050963, dated Mar. 6, 2012.

(Continued)

*Primary Examiner* — Bryan Earles

(74) *Attorney, Agent, or Firm* — Alston & Bird LLP

(57) ABSTRACT

In accordance with an example embodiment of the present invention, a method for proximity based input is provided, comprising: receiving information on presence of an object in close proximity to a touch screen surface, detecting a display element currently associated with the object, the display element being visualized to be displaced from the screen surface level in the z-direction substantially perpendicular to the screen surface, and adapting the display element on the basis of distance between object and the screen, wherein the display element is visualized to locate substantially at the touch screen surface level in response to detecting the object to touch the touch screen surface.

16 Claims, 5 Drawing Sheets

(56) References Cited

U.S. PATENT DOCUMENTS

| | | | |
|---|---|---|---|
| 2009/0058829 A1* | 3/2009 | Kim et al. | 345/173 |
| 2009/0102805 A1* | 4/2009 | Meijer et al. | 345/173 |
| 2009/0315848 A1* | 12/2009 | Ku et al. | 345/173 |
| 2010/0026723 A1* | 2/2010 | Nishihara et al. | 345/671 |
| 2010/0090964 A1* | 4/2010 | Soo et al. | 345/173 |
| 2010/0093400 A1* | 4/2010 | Ju et al. | 455/566 |
| 2010/0095206 A1 | 4/2010 | Kim | |
| 2010/0156807 A1* | 6/2010 | Stallings et al. | 345/173 |
| 2010/0295559 A1* | 11/2010 | Osoinach | 324/658 |
| 2010/0315413 A1* | 12/2010 | Izadi | G06F 3/017 345/419 |
| 2011/0252375 A1* | 10/2011 | Chaudhri | 715/835 |
| 2011/0316679 A1* | 12/2011 | Pihlaja | 340/407.2 |
| 2012/0036433 A1* | 2/2012 | Zimmer et al. | 715/702 |

FOREIGN PATENT DOCUMENTS

| | | |
|---|---|---|
| DE | 10 2004 025 517 A1 | 12/2005 |
| EP | 1 739 980 A1 | 1/2007 |
| EP | 2 109 030 A2 | 10/2009 |
| EP | 2 372 515 A2 | 10/2011 |
| WO | WO 2009/122214 A2 | 10/2009 |

OTHER PUBLICATIONS

Kruger, A., et al.; "About Two Physical Interaction Metaphors: Narrowing the Gap between the Virtual and the Real World"; 2009 International Symposium on Ubiquitous Virtual Reality; Piscataway, NJ, USA; Jul. 2009; pp. 11-14; XP031526026.

Canadian Office Action from Canadian Patent Application No. 2,817,181 dated Jun. 2, 2014.

Office Action from Russian Patent Application No. 2013127015 dated Sep. 15, 2014.

Office Action for European Application No. EP 11 794 200.3 dated Apr. 11, 2014.

Office Action for Canadian Application No. 2,817,181 dated Jun. 8, 2015.

Office Action and Search Report from corresponding African Regional Intellectual Property Organization (ARIPO) Patent Application No. AP/P/2013/006903 dated Jul. 7, 2015.

Office Action for Chinese Application No. 201180061625.3 dated Jul. 27, 2015.

Office Action for Chinese Application No. 201180061625.3 dated Nov. 10, 2016.

Second Office Action for Chinese Application No. 201180061625.3, dated May 24, 2016, with English summary, 25 pages.

Office Action for European Patent Application No. EP 11 794 200.3 dated Sep. 8, 2017, 8 pages.

Office Action for European Application No. 11 794 200.3 dated Aug. 8, 2018, 6 pages.

* cited by examiner

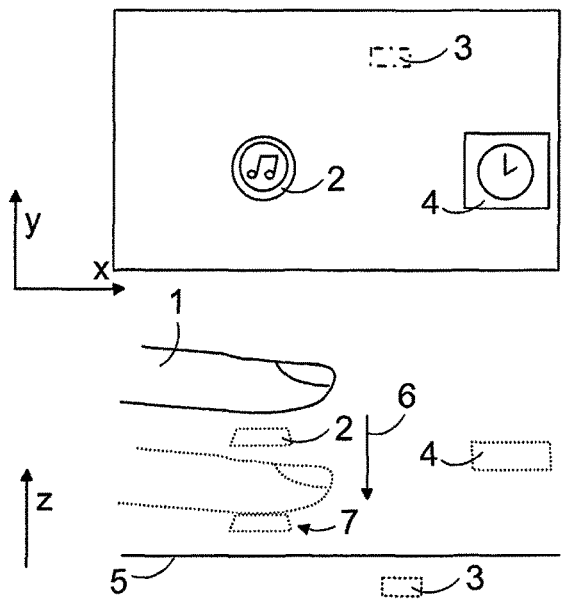
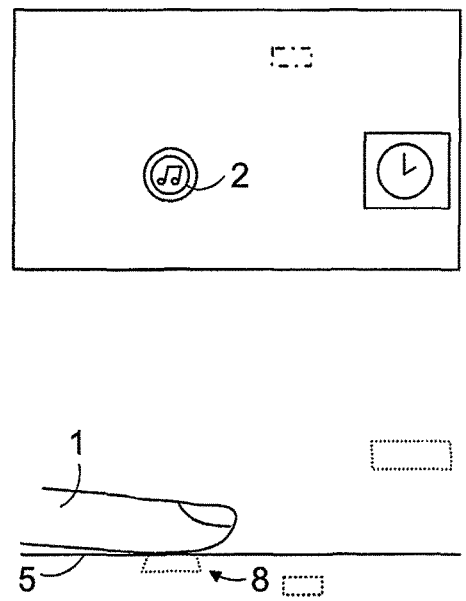
Fig. 1a    Fig. 1b
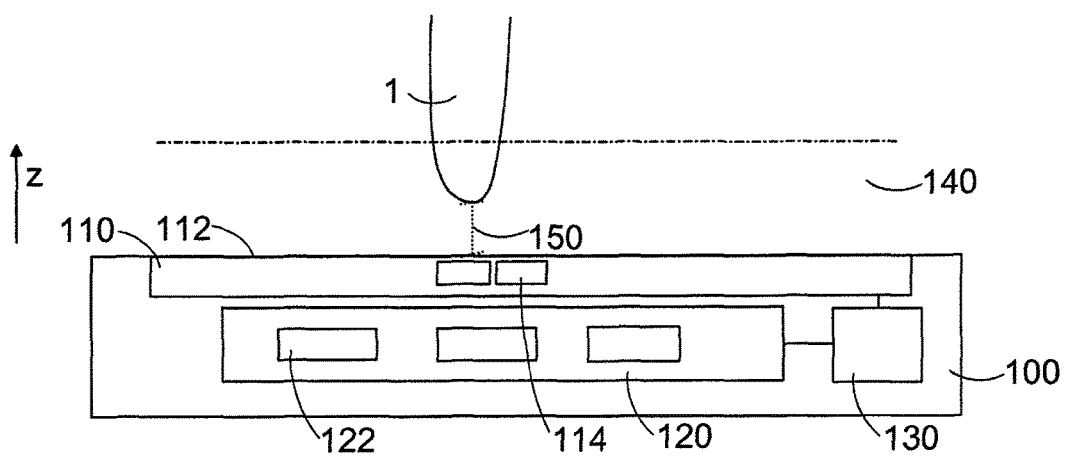
Fig. 2

APPARATUS AND METHOD FOR USER INPUT FOR CONTROLLING DISPLAYED INFORMATION

FIELD

The present invention relates to an apparatus and a method for user input for controlling displayed information.

BACKGROUND

Touch screens are widely used in many portable electronic devices, for instance in PDA (Personal Digital Assistant) devices, tabletops, touch surfaces, and mobile devices. Touch screens are operable by a pointing device (or stylus) and/or by a finger. Typically the devices also comprise conventional buttons for certain operations.

Stereoscopic or 3D displays capable of displaying stereoscopic images have been developed also for portable and handheld devices. Stereoscopic displays may be used to display user interface (UI) items such that the user perceives a three-dimensional (3D) image. The introduction of stereoscopic displays also brings new challenges and possibilities for user interaction design.

SUMMARY

Various aspects of examples of the invention are set out in the claims.

According to an aspect, an apparatus is provided, comprising at least one processor; and at least one memory including computer program code, the at least one memory and the computer program code configured to, with the at least one processor, cause the apparatus at least to perform: receive information on presence of an object in close proximity to a touch screen surface, detect a display element currently associated with the object, the display element being visualized to be displaced from the screen surface level in the z-direction substantially perpendicular to the screen surface, and adapt the display element on the basis of distance between object and the screen surface, wherein the display element is visualized to locate substantially at the touch screen surface level in response to detecting the object to touch the touch screen surface.

According to an aspect, a method is provided, comprising: receiving, by an apparatus, information on presence of an object in close proximity to a touch screen surface, detecting a display element currently associated with the object, the display element being visualized to be displaced from the screen surface level in the z-direction substantially perpendicular to the screen surface, and adapting the display element on the basis of distance between object and the screen surface, wherein the display element is visualized to locate substantially at the touch screen surface level in response to detecting the object to touch the touch screen surface.

According to an example embodiment, a display operation to adapt the visualized displacement of the display element in the z-direction is controlled on the basis of a disparity value dependent on the detected distance.

The invention and various embodiments of the invention provide several advantages, which will become apparent from the detailed description below.

BRIEF DESCRIPTION OF THE DRAWINGS

For a more complete understanding of example embodiments of the present invention, reference is now made to the following descriptions taken in connection with the accompanying drawings in which:

FIGS. 1a and 1b illustrate manipulation of appearance of display elements of a stereoscopic display according to an example embodiment;

FIG. 2 is a simplified block diagram of a side view of an apparatus in accordance with an example embodiment of the invention;

DETAILED DESCRIPTION

Figure 3:
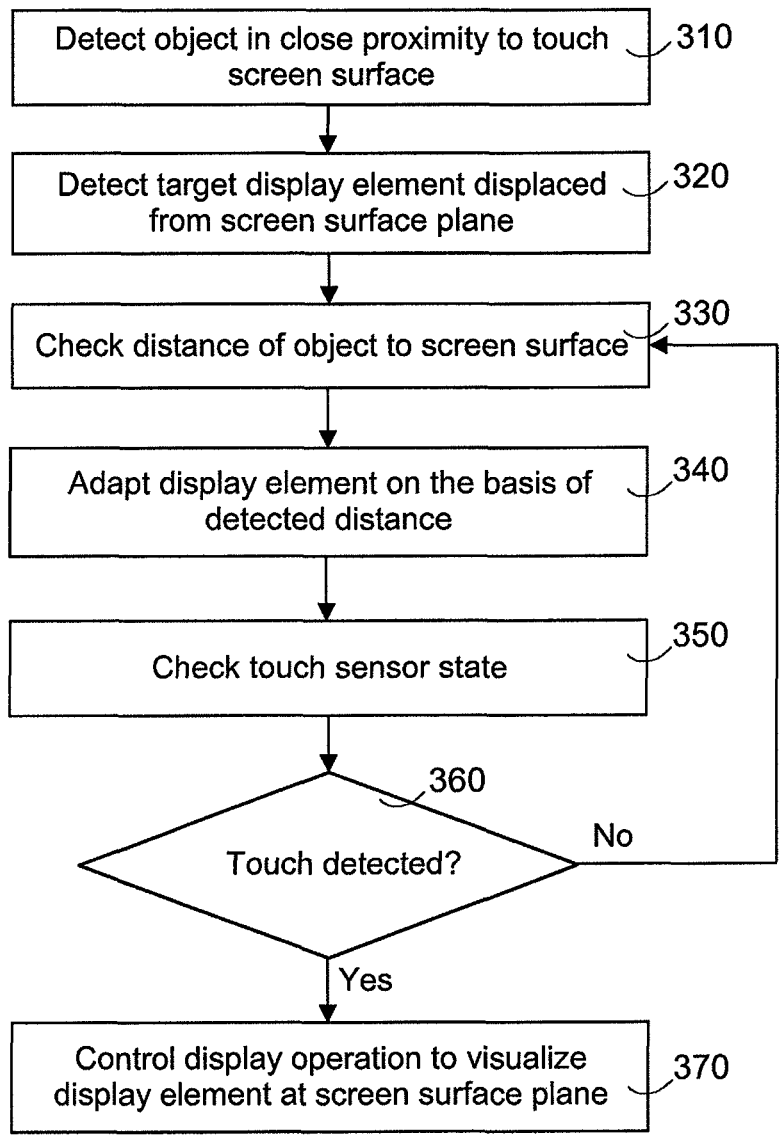
FIGS. 3 to 5 illustrate methods according to example embodiments of the invention.

FIG. 1a illustrates display of display elements 2, 3, 4, such as graphical items or icons representing data items and/or available actions, of virtual three-dimensional view of a display of an electronic device, such as a handheld mobile device. The upper view illustrates a front view of the screen in x and y directions, substantially parallel to the screen surface 5, and the lower view illustrates a side view in z-direction substantially perpendicular to the screen surface 5. The display elements 2-4 may be displayed by a stereoscopic display providing a 3D effect such that at least some display elements appear to be positioned at different levels relative to the touch screen surface level, e.g. one display element 2 at a first level and another display element 3 at a second level relative to the touch screen surface level 5. At least some of the display elements may thus be visualized to be displaced from the screen surface level in the z-direction. It will be appreciated that display elements 2-4 may have various forms, and in some embodiments their shape can be modified by the user. For example, display elements 2 and 4 may be "floating" above the screen surface 5 and the display element 3 may be illustrated to be positioned in the background, below the screen surface level 5.

In example embodiments hovering is used to control appearance and/or position of one or more display elements 2-4. Hovering refers generally to introduction of an input object 1, such as a finger or a stylus, in close proximity to, but not in contact with a touch screen surface 5. The illustrated position of the display element(s) in the z-direction may be adapted on the basis of detected distance of the object to the screen surface 3. This refers generally to any kind of display operation facilitating perception of the display element approaching the screen surface or distancing from the screen surface. The detection of the distance may include detection based on a specifically estimated distance value or based on a signal value dependent on the distance of the object, for example. Thus, on the basis of repetitive and/or continuous monitoring of the distance of the object 1, the display element(s) may be controlled in relation to the movement of a finger towards/away from the touch screen.

Amongst displayed display elements 2-4 of a 3D view, one or more of the display elements 2-4 may be detected as target elements on the basis of the position of the object 1. A display operation to cause movement 6 of a target display element 2 may be controlled in accordance with a detected change of the distance of the object 1. When the object 1 approaches the screen surface 3, the display element may be visualized, by 3D effects, to move 6, 7 towards the touch screen surface 5. As illustrated in FIG. 1b, when the input object 1 is detected to touch the screen surface 3, the targeted display element 2 may be visualized 8 to be located in the screen surface plane. Thus, the user may be provided with a perception of the display element meeting the finger in z-direction at the screen surface level. This enables to improve touch experience and provide better intuitive and interactive user sensation interacting with GUI objects of 3D view at different depth levels. Further, without limiting the scope of the claims, it may be possible to reduce sick feeling caused to some users when attempting to select icons appearing above or below the screen surface level by touching the screen surface.

FIG. 2 illustrates an example apparatus 100 in which the hovering based display element control may be provided. The apparatus 100 may be a peripheral device or integrated in an electronic device. Examples of electronic devices include any consumer electronics device like computers, media players, wireless communications terminal devices, and so forth.

The example apparatus 100 comprises a touch screen display 110 with a plurality of touch sensitive detectors 114 to sense touch inputs to the touch screen surface. The apparatus 100 comprises a proximity detection system or unit 120 configured to detect when an input object 1 is brought in close proximity to, but not in contact with, a touch screen surface 112. A sensing area 140, which may also be referred to as a hovering area, may illustrate the approximate area and/or distance at which a hovering input object 1 and hovering inputs are detected. A user input, such as a particular detected gesture, in the hovering area 140 detected at least partly based on the input object 1 not touching the screen surface 112 may be referred to as a hovering input. Such hovering input is associated with at least one function, for instance selection of a display element, zooming a display area, activation of a pop-up menu, modification of a display element, or moving a display element. The hovering input object 1 and hovering inputs may be detected on the basis of a sensing signal or the distance 150 of the input object 1 to the screen surface 112 meeting a predefined threshold value. In some embodiments the hovering area 140 enables also inputting and/or accessing data in the apparatus 100, even without touching the screen surface 112.

In some embodiments the detection system 120 generates a sensing field by one or more proximity sensors 122. In one example embodiment a capacitive proximity detection system is applied, whereby the sensors 122 are capacitive sensing nodes. Disturbances by one or more input objects 100 in the sensing field are monitored and presence of one or more objects is detected based on detected disturbances. A capacitive detection circuit 120 detects changes in capacitance above the screen surface 112.

However, it will be appreciated that the present features are not limited to application of any particular type of proximity detection. The proximity detection system 120 may be based on infrared proximity detection, optical shadow detection, acoustic emission detection, ultrasonic detection, or any other suitable proximity detection technique. For instance, in case the proximity detection system 120 would be based on infrared detection, the system would comprise one or more emitters sending out pulses of infrared light. One or more detectors would be provided for detecting reflections of that light from nearby objects 100. If the system detects reflected light, then an input object is assumed to be present.

The detection system 120 may be arranged to estimate (or provide a signal enabling estimation of) the distance of the input object 1 from the screen surface 112, which enables to provide z coordinate data of the location of the object 1 in relation to the screen surface 112. This may be performed continuously, or in some other embodiments at certain time periods, and/or upon some trigger. The proximity detection system 120 may also be arranged to generate information on x, y position of the object 1 in order to be able to determine a target display element or area of a hovering input. Depending on the proximity detection technique applied, the size of the apparatus 100 and the screen surface 112, and the desired user interaction, the hovering area 140 may be arranged to extend from the screen surface 112 by distance selected from some millimeters to even up to multiple dozens of centimeters, for example.

The apparatus 100 may comprise a stereoscopic display capable of displaying stereoscopic views. The stereoscopic display may be arranged to generate 3D view(s), i.e. views comprising the entire view or at least some display elements with 3D effects and visualized at various depth levels (in z-direction), such as display elements 2-4 as illustrated in FIGS. 1a and 1b. The stereoscopic display may direct information from certain sub-pixels of an image in different directions, so that a viewer can see a different image with each eye. If the images are similar enough, the human brain will assume that the viewer is looking at a single object and fuse matching points on the two images together to create a perceived single object. The data for a 3D display element may be obtained for instance by taking multiple two-dimensional images and by combining the pixels of the images to sub-pixels of a single image for the presentation on the stereoscopic display. In one alternative, two cameras that are arranged at a small pre-specified distance relative to each other take the two-dimensional images for a 3D presentation. Each camera may comprise an image chain applying an image processing to the captured images. The stereoscopic display system may also comprise a user imaging device and eye location tracking functionality. The display may have specific 2D and 3D modes, and the system may switch between those modes. Depending on desired implementation and applied stereoscopic display technology, the touch screen 110 may be arranged to provide stereoscopic display features, or elements of the stereoscopic display may be at least partly separate from the touch screen 110 (not specifically shown in FIG. 2). In one embodiment the stereoscopic display is an autostereoscopic display and the 3D views are autostereoscopic views, which refers generally to a stereoscopic presentation of a display element not requiring specific glasses for the user. Various autostereoscopic displays may be applied, for example autostereoscopic displays based on parallax barriers and/or lenticular lenses or applying holography and/or eye-tracking.

The proximity detection system 120 is coupled to a controller 130. The proximity detection system 120 is configured to provide the controller 130 with signals when an input object 1 is detected in the hovering area 140. Based on such input signals, commands, selections and other types of actions may be initiated, typically causing visible, audible and/or tactile feedback for the user. Touch inputs to the touch sensitive detectors 114 may be signalled via a control circuitry to the controller 130, or another controller.

The controller 130 may also be connected to one or more output devices, such as a touch screen display with 3D display features and/or a separate display unit capable of providing 3D sensation. The controller 130 may be configured to control different application views on the display 110. The controller 130 may detect touch inputs and hovering inputs on the basis of the signals from the proximity detection system 120 and the touch sensitive detectors 114. The controller 130 may then control a display function associated with a detected touch input or hovering input. Further, the controller 130 may be arranged to detect a display element currently targeted and associated with the hovering object 1, and cause a display operation to adapt the visualized (depth) position of the display element in z-direction on the basis of information dependent on the current distance of the object 1 to the screen surface 112. Some examples of further features, which may at least partially be carried out by the controller 130, are illustrated below. It will be appreciated that the controller 130 functions may be implemented by a single control unit or a plurality of control units.

It will be appreciated that the apparatus 100 may comprise various further elements not discussed in detail herein. Although the apparatus 100 and the controller 130 are depicted as a single entity, different features may be implemented in one or more physical or logical entities. For instance, there may be provided a chipset apparatus configured to carry out the control features of the controller 130. There may be further specific functional module(s), for instance for carrying out one or more of the blocks described in connection with FIG. 3.

FIG. 3 shows a method for controlling manipulation of display elements based on hovering according to an example embodiment. The method may be applied as a control algorithm by the controller 130, for example.

A presence of an object in close proximity to a screen surface is detected 310. It is to be noted that in some embodiments information on presence of the object is received and the detection is based on this received information.

A display element targeted by the hovering input object is detected 320. The detection of the target display element refers generally to detection of a display element currently associated with the hovering object, and may be detected on the basis of the current x, y position of the object 1. However, further conditions, such as the distance 150 of the object 1 may affect the detection of the target display element. The display element is visualized to be displaced from the screen surface plane, i.e. it may be illustrated to locate above or below the touch screen surface 5.

The distance of the object 1 to the screen surface 112 is checked 330. This check may be performed on basis of a signal or value generated by the proximity detection system 120, for example.

The display element is adapted on the basis of the currently detected distance. Thus, a display operation may be controlled 340 to adapt the illustrated position of the display element in z-direction. Controlling of a display operation is to be understood broadly to an action causing and leading to a change in the display element perceived by the user. For example, this may involve adapting output image(s) by repositioning the image(s), fetching new image(s) from an image database and/or re-rendering 2D/3D vector graphics in real-time.

The example procedure of FIG. 3 is also monitoring touch sensor state 350. The state of the touch sensor may be checked 350, 360 on the basis of a signal from the display controller, for example. If a touch input has not been detected, block 330 may be returned and the distance may be again checked, for example periodically. If a touch to the touch screen surface 112 is detected, block 370 may be entered and a display operation is controlled to visualize the display element to locate at the screen surface plane (5).

This enables to adapt the visualized display element depth position on the basis of the distance of the input object 1 to the touch screen surface such that the user can perceive the display element to approach the finger and meet the finger when touching the touch screen surface 112.

A user interface of an apparatus, such as the apparatus 100, may be configured to provide at least some of the input/output related functions of FIG. 3. It is to be appreciated that various modifications and additions may be made to the example method of FIG. 3. For example, the hovering input object 1 and the currently targeted display element 2 may be detected substantially at the same time, or the user may perform the hovering input only some time after block 310. Another example is that there may be a further checking procedure to check if removal of the object from the close proximity to the screen surface 112 is detected. When the object is no longer detected in the hovering area 140, the procedure of FIG. 3 may be ended. Some further example embodiments are illustrated below.

Referring also to the example of FIGS. 1a and 1b, the apparatus 100 may thus be arranged to adapt (340) the display to illustrate the display element 2 to move 6 at least in the z-direction. Thus, the targeted display element 2 may be arranged to react to hovering finger movement, and the user may be provided with a sensation of the display element 2 moving with the finger. If the display element 3 is displayed in the background, below or "behind" the screen surface level 3, the user's finger and the display element 3 may be visualized to move to opposite directions and meet on the screen. If the display element 2 is above the screen, visually the icon and the finger can move to the same direction and meet on the screen surface level.

Depending on the applied technology for creating the 3D sensation, there various options to arrange the display operations 340, 370 to adapt the perceived display element position in the z-direction. In some embodiments, this involves changing the lateral x-direction position of 2D display items used for generating the display element 3 with 3D effect. These operations may also involve adapting the size and/or form of the display element 3.

In some embodiments, the visualized displacement of the display element in the z-direction in relation to the screen surface level is controlled on the basis of a disparity value dependent on the detected distance of the object 1 to the screen surface 5. Disparity herein refers generally to the difference and offset between an image generated for left eye view and another image generated for right eye view, which may be referred to as left-eye image and right-eye image, each having a particular screen location on the x, y screen plane. The disparity value can be any kind of parameter affecting or defining the lateral offset in the x-direction between left-eye and right-eye images, causing change in perceived depth position of the resulting display element. The disparity value may directly define parallax between the left-eye and right-eye images, defining the perceived depth position of the display element. When plus-parallax (+ parallax) is applied, the user may perceive the display element 2 floating above the screen 5. When minus-parallax (− parallax) is applied, the UI components appear to be under the screen 5. For example, in the example of FIGS. 1a and 1b, an illustration of the display element 2 approaching the screen surface 5 may be provided on the basis of reducing the lateral offset between two 2D images forming the display element.

Figure 4:
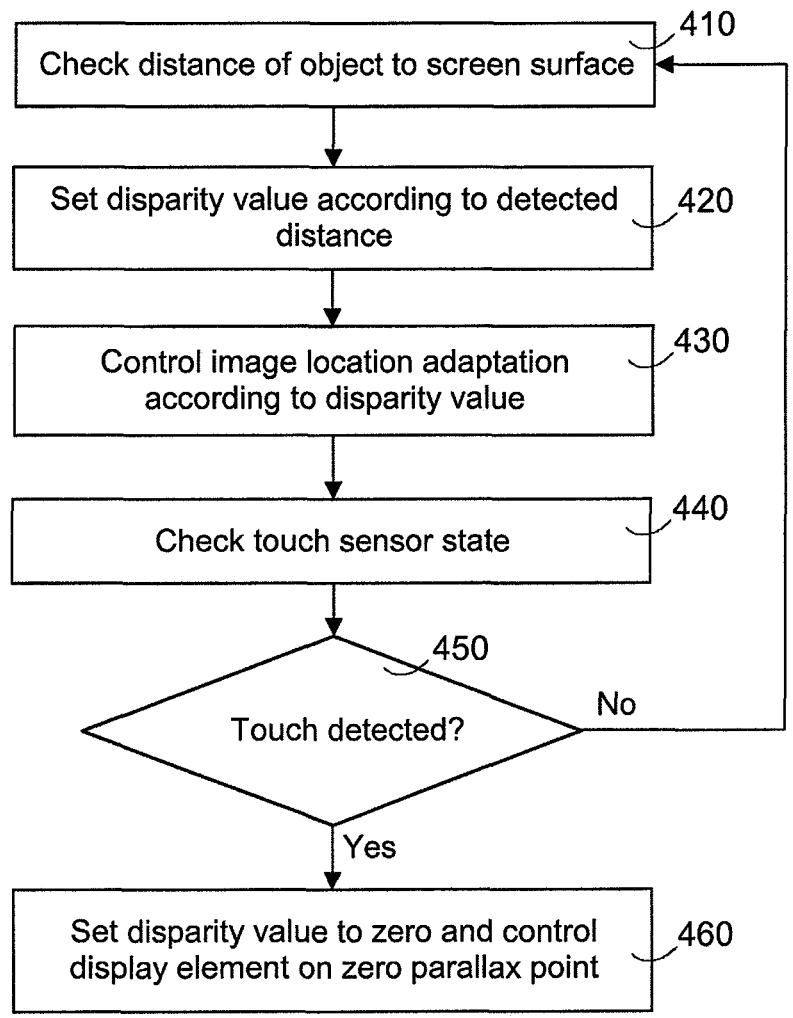

FIG. 4 illustrates an example method, similar to the method of FIG. 3, which may be carried out after block 320 of FIG. 3, for example. After detecting 410 a current distance to the screen surface, a disparity value is set 420. For example, a memory connected to the controller 130 may store a mapping table or some other type of data structure with a set of distances (or distance ranges) and corresponding disparity values.

A display element adaptation operation is controlled 430 to adapt the illustrated position of the display element in z-direction according to the disparity value. This may refer to any kind of operation changing the x-direction displacement or offset between two (copies of) images forming the display element. Then, the X-direction position coordinates of one or both of the images may be changed and a rendering operation may be carried out to display the images at an adapted screen location. It is to be noted that the images may be at least partly overlapping. The two output images may be further adapted, e.g. by controlling display of image(s) fetched from image database, or re-rendering 2D/3D vector graphics in real time.

If a touch input has not been detected on the basis of the check 440, 450, block 410 may be returned to and the distance may be again checked, for example periodically. This enables to provide automatic adjustment of the targeted display element's disparity to the screen surface level according to the hovering distance.

If a touch to the touch screen surface 112 is detected, block 460 may be entered and the disparity may be set to zero, resulting in the display element being illustrated at the screen surface level 5. Thus, there is no lateral difference between the left-eye image and the right-eye image, but a single 2D image may be displayed, and no 3D depth effect is provided. The screen plane z-position may be initially set as zero parallax point (ZPP), and the display element is controlled in block 460 on the ZPP.

It is to be appreciated that the target display element 3 could be visualized also to move away from the screen surface 112, by adding the disparity, to facilitate a sensation of the display element following a receding object.

Figure 5:
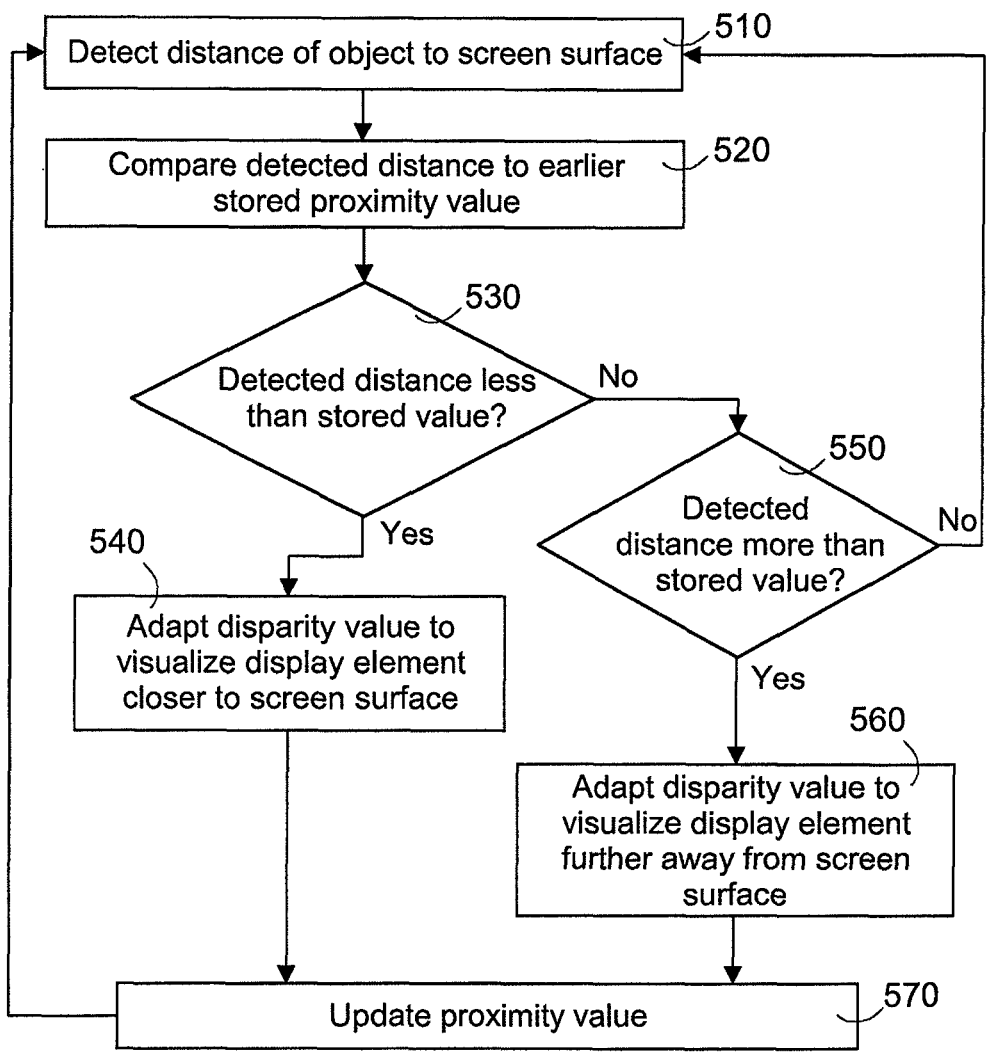

FIG. 5 illustrates an example method which may be applied by the controller 130 in connection with blocks 410 and 420, for example. After detecting 510 the current distance of the object 1 to the screen surface 112, the detected distance is compared 520, 530, 550 to an earlier stored proximity value, which represents a previously detected distance. If the detected distance is less than the stored value, the disparity value is adapted 540 to cause visualization of the display element closer to the screen surface 112. In case of + parallax, i.e. the display element 2 illustrated above the screen surface 5, the controller 130 may thus reduce the displacement of images in the x-direction. In case of − parallax, the controller 130 may thus increase the displacement of images in the X-direction.

If the detected distance is more than the stored value, the disparity value is adapted 560 to cause visualization of the display element further away from the screen surface 112. For example, in case of + parallax, the controller 130 may thus increase the displacement of images in the x-direction. In block 570 the stored proximity value is updated with the value detected in block 510, and the procedure may return to block 510 (if the object is still hovering within the hovering area 140).

In an embodiment, in response to detecting a touch input, for example in block 370/460, 2D display mode is entered and the 3D view is changed into 2D view. Thus, 3D effects may be removed, for some or all of the displayed elements, and the user may input further touch inputs on 2D images.

In some example embodiments, the apparatus 100 is configured to detect the lateral position of the object 1 in x, y directions parallel to the screen surface 3. This may be detected in connection with block 330, for example. The visualized movement of the targeted display element 2 may also be controlled (e.g. in block 340) in accordance with the detected lateral position, so that the display element moves laterally similarly as the object.

In one example embodiment, the apparatus 100 is configured to detect a virtual touch of the object 1 to a display element 2 (appearing above the screen surface 5) in block 320. Thus, the display element may be detected as the target display element in response to detecting the virtual touch. In response to detecting a push hovering action, i.e. the object to approach the screen surface 5 after detecting the virtual touch, the apparatus may be configured to adapt the appearance of the display element 2 in block 340 and/or 370, for example.

The apparatus 100 may be configured to detect hovering gesture(s). In one example embodiment, the apparatus is in block 320 configured to detect a hovering gesture associated with at least display element 2. The selection and/or illustration of movement of the display element may be controlled 330 in accordance with the hovering gesture. For example, the apparatus 100 may be arranged to detect a rotation or double-click feature associated with the target display element 2.

In some example embodiments, the apparatus 100 is configured to control display operations on the display element on the basis of further properties associated with movement of the input object 1 in the hovering area 140. In one further example embodiment, the apparatus 100 is configured to estimate speed of movement of the object 1. The apparatus may be further arranged to select the display operation for adapting (e.g. in block 340/370) the display element appearance in accordance with the detected speed. There may be one or more threshold parameters affecting the selection of the display operation to be dependent on the speed of movement of the object.

The proximity detection system 120 may be arranged to detect a simultaneous or combined use of two or more objects 1. In one example embodiment, the associated display element is detected in response to detecting two or more fingers hovering above the screen surface. In another example, the display element may be detected and/or the appearance of the display element may be modified in response to detecting two hovering fingers. Features illustrated above, in connection with FIG. 3, for example, may be applied separately for each detected finger or a combination of fingers.

In an example embodiment, further effects are applied in connection with one or more of blocks 340, 370, 430, 460, 540, 560. For example, further visual, audible, and/or haptic output may be generated.

In an example embodiment, the apparatus 100 is arranged to detect pressure applied to the touch screen. The touch sensors 114 may be arranged generate a signal representing the pressure applied by the object 1 to the screen surface 112, for example. The controller 130 may receive information relative to the detected pressure, and this information may be applied for further adapting the target display element. The illustrated z-position of the display element 2 may be adapted on the basis of the pressure. For example, after the display element 2 is touched, when the screen surface is detected to be pushed harder, the display element 2 can be illustrated to move from the position 8 below the screen surface level 5.

It is to be appreciated that two or more of the above-illustrated example conditions may be used to influence the display operations. In addition to the already above illustrated embodiments, a broad range of further functions is available for selection to be associated with an input detected by a touch sensitive detection system and/or the proximity detection system 120. The controller 130 may be configured to adapt the associations according to a current operating state of the apparatus 100, a user input or an application executed in the apparatus 100, for instance. For instance, associations may be application specific, menu specific, view specific and/or context (which may be defined on the basis of information obtained from the current environment or usage of the apparatus 100) specific.

Figure 6:
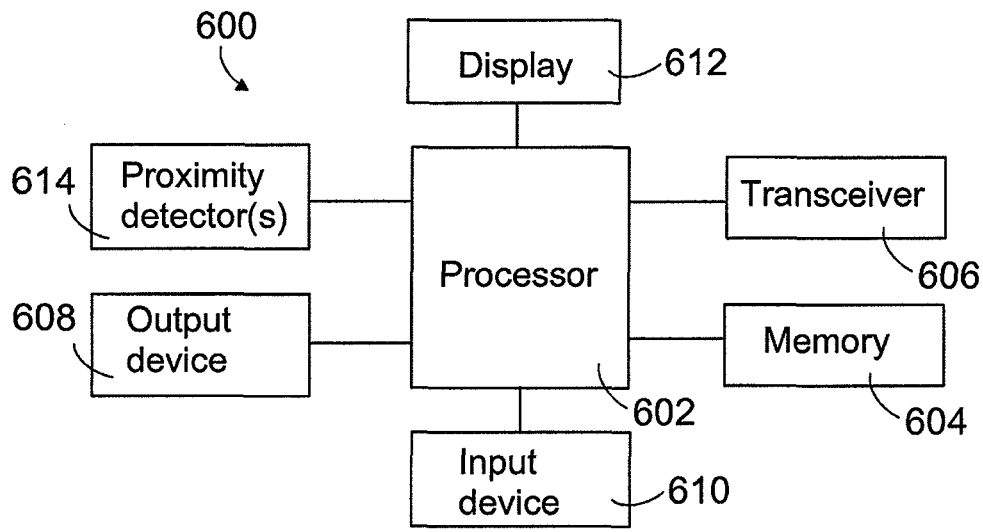
FIG. 6 illustrates an electronic device in accordance with an example embodiment of the invention.

FIG. 6 shows a block diagram of the structure of an electronic device 600 according to an example embodiment. The electronic device may comprise the apparatus 100. Although one embodiment of the electronic device 600 is illustrated and will be hereinafter described for purposes of example, other types of electronic devices, such as, but not limited to, PDAs, pagers, mobile computers, desktop computers, laptop computers, tablet computers, media players, televisions, gaming devices, cameras, video recorders, positioning devices, electronic books, wearable devices, projector devices, touch surfaces, touch enabled walls, and other types of electronic systems, may employ the present embodiments.

Furthermore, the apparatus of an example embodiment need not be the entire electronic device, but may be a component or group of components of the electronic device in other example embodiments. For example, the apparatus could be in a form of a chipset or some other kind of hardware module for controlling by performing at least some of the functions illustrated above, such as the functions of the controller 130 of FIG. 2.

A processor 602 is configured to execute instructions and to carry out operations associated with the electronic device 600. The processor 602 may comprise means, such as a digital signal processor device, a microprocessor device, and further circuitry, for performing various functions including, for example, one or more of the functions described in conjunction with FIGS. 3 to 5. The processor 602 may control the reception and processing of input and output data between components of the electronic device 600 by using instructions retrieved from memory. The processor 602 can be implemented on a single-chip, multiple chips or multiple electrical components. Some examples of architectures which can be used for the processor 602 include dedicated or embedded processor, and ASIC. For simplicity, the processor 602 is illustrated in FIG. 6 as a single block, but it will be appreciated that the electronic device 600 may comprise a plurality of control sub-systems, such as one or more of an I/O sub-system, an application processing sub-system and communications protocol processing sub-system, each of which may comprise one or more controllers. It is to be appreciated that there may be a specific controller between the processor 602 and the display 612 carrying out at least some of the features illustrated above in connection with FIGS. 3 to 5, such as a disparity adjuster adjusting the disparity value.

The processor 602 may comprise functionality to operate one or more computer programs. Computer program code may be stored in a memory 604. The at least one memory and the computer program code may be configured to, with the at least one processor, cause the apparatus to perform at least one embodiment including, for example, control of one or more of the functions described in conjunction with FIGS. 3 to 5. For example, the processor 602 may be arranged to perform at least part of the functions of the controller 130 of FIG. 2. Typically the processor 602 operates together with an operating system to execute computer code and produce and use data.

By way of example, the memory 604 may include non-volatile portion, such as EEPROM, flash memory or the like, and a volatile portion, such as a random access memory (RAM) including a cache area for temporary storage of data. Information for controlling the functionality of the processor 802 could also reside on a removable storage medium and loaded or installed onto the electronic device 600 when needed.

The electronic device 600 may comprise an antenna (or multiple antennae) in operable communication with a transceiver unit 606 comprising a transmitter and a receiver. The electronic device 600 may operate with one or more air interface standards and communication protocols. By way of illustration, the electronic device 600 may operate in accordance with any of a number of first, second, third and/or fourth-generation communication protocols or the like. For example, the electronic device 600 may operate in accordance with wireline protocols, such as Ethernet and digital subscriber line (DSL), with second-generation (2G) wireless communication protocols, such as Global System for Mobile communications (GSM), with third-generation (3G) wireless communication protocols, such as 3G protocols by the Third Generation Partnership Project (3GPP), CDMA2000, wideband CDMA (WCDMA) and time division-synchronous CDMA (TD-SCDMA), with fourth-generation (4G) wireless communication protocols, such as 3GPP Long Term Evolution (LTE), wireless local area networking protocols, such as 802.11, short-range wireless protocols, such as Bluetooth, and/or the like.

The user interface of the electronic device 600 may comprise an output device 608, such as a speaker, one or more input devices 610, such as a microphone, a keypad or one or more buttons or actuators, and a display device 612 appropriate for the electronic device 600 in question.

The input device 610 may include a touch sensing device configured to receive input from a user's touch and to send this information to the processor 602. Such touch sensing device may be configured to recognize also the position and magnitude of touches on a touch sensitive surface. The touch sensing device may be based on sensing technologies including, but not limited to, capacitive sensing, resistive sensing, surface acoustic wave sensing, pressure sensing, inductive sensing, and optical sensing. Furthermore, the touch sensing device may be based on single point sensing or multipoint sensing. In one embodiment the input device is a touch screen, which is positioned in front of the display 612.

The electronic device 600 also comprises a proximity detection system 614 with proximity detector(s), such as the system 120 illustrated earlier, operatively coupled to the processor 602. The proximity detection system 614 is configured to detect when a finger, stylus or other pointing device is in close proximity to, but not in contact with, some component of the computer system including for example housing or I/O devices, such as the touch screen.

The electronic device 600 may comprise also further units and elements not illustrated in FIG. 6, such as further interface devices, further sensors (e.g. an accelerometer sensor), a battery, a media capturing element, such as a camera, video and/or audio module, a positioning unit, and a user identity module.

In some embodiments further outputs, such as an audible and/or tactile output may also be produced by the apparatus 100 e.g. on the basis of the detected hovering input. Thus, the processor 602 may be arranged to control a speaker and/or a tactile output actuator, such as a vibration motor, in the electronic device 600 to provide such further output.

Figure 7:
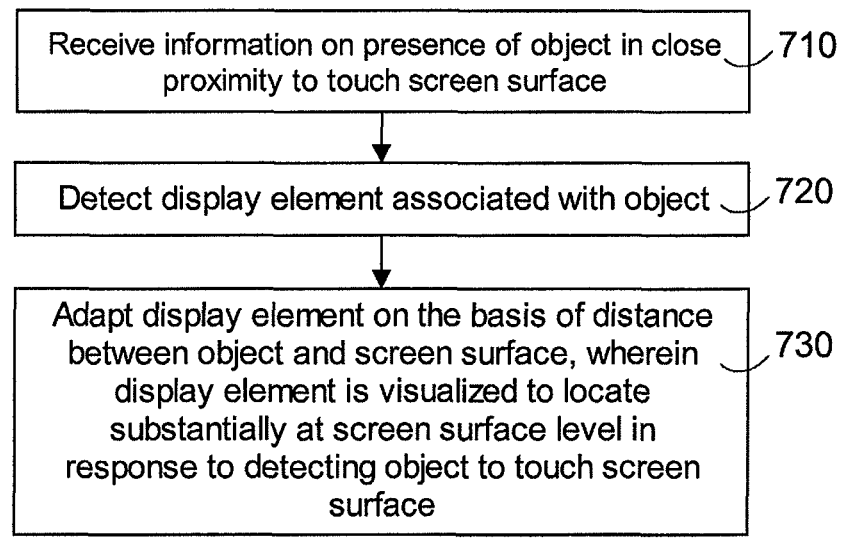
FIG. 7 illustrates a method according to an example embodiment.

FIG. 7 illustrates a further example method, which may be carried out by an apparatus, such as the controller 130 or the processor 602. In block 710 information on presence of an object in close proximity to a touch screen surface is received. A display element currently associated with the object is detected 720, the display element being visualized to be displaced from the screen surface level in the z-direction substantially perpendicular to the screen surface. The display element is adapted 730 on the basis of a distance between the object and the screen surface, wherein the display element is visualized to locate substantially at the touch screen surface level in response to detecting the object to touch the touch screen surface. It will be appreciated that at least some of the above illustrated further embodiments may be applied in connection with the method of FIG. 7, similarly as with the method illustrated in FIG. 3, for example.

Embodiments of the present invention may be implemented in software, hardware, application logic or a combination of software, hardware and application logic. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 6. A computer-readable medium may comprise a tangible and non-transitory computer-readable storage medium that may be any media or means that can contain or store the instructions for use by or in connection with an instruction execution system, apparatus, or device, such as a computer.

In one example embodiment, there may be provided circuitry or user interface circuitry configured to provide at least some control functions illustrated above. As used in this application, the term 'circuitry' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present. This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware.

If desired, at least some of the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The invention claimed is:

1. An apparatus, comprising: at least one processor and at least one memory including computer program code, the at least one memory and the computer program code configured to, with the at least one processor, cause the apparatus at least to:
   receive information on presence of an object in a first position and in close proximity to a touch screen surface;
   receive an indication of a display element currently associated with the object and selected from a first display element and a second display element, the display element being displayed such that (i) an entirety of the display element appears spaced apart from the screen surface level in a z-direction substantially perpendicular to the screen surface so as to create an appearance of a gap in the z-direction between the entirety of the display element and the screen surface, and (ii) the display element appears displaced from at least one other display element in an xy plane parallel to the screen surface;
   receive an indication of a transition of the object from the first position towards the touch screen to a second position, wherein the second position indicates the object is substantially in contact with the touch screen surface; and
   in response to the indication of the transition of the object,
      in an instance in which the first display element that is currently associated with the object appears to float above the screen surface level in the z-direction, cause the first display element to move in the same direction as the object towards the touch screen, and display the first display element substantially at the touch screen surface and substantially in contact with the object; and
      in an instance in which the second display element that is currently associated with the object appears to float below the screen surface level in the z-direction on an opposite side of the touch screen surface as compared to the position of the object, cause the second display element to move in a direction opposite to the direction of movement of the object towards the touch screen surface, and display the second display element substantially at the touch screen surface and substantially in contact with the object.

2. The apparatus of claim 1, wherein the at least one memory and the computer program code are further configured to at least cause the apparatus to:
   cause the display element currently associated with the object to change on the basis of a disparity value dependent on a detected distance.

3. The apparatus of claim 2, wherein the disparity value defines displacement between two images of the display element in x-direction substantially parallel to the screen surface.

4. The apparatus of claim 3, wherein the apparatus is configured to set the disparity value as zero in response to receiving indication of the transition.

5. The apparatus of claim 1, wherein the at least one memory and the computer program code are further configured to at least cause the apparatus to:
change a display mode from a three-dimensional mode to a two-dimensional mode in response to receiving indication of the transition.

6. The apparatus of claim 1, wherein the at least one memory and the computer program code are further configured to at least cause the apparatus to:
receive indication of a virtual touch of the object to a portion of a display element; and
associate the display element with the object in response to receiving indication of the virtual touch.

7. The apparatus of claim 1, wherein the apparatus is a mobile communications device comprising the touch screen.

8. A method, comprising:
receiving information on presence of an object in a first position and in close proximity to a touch screen surface;
receiving an indication of a display element currently associated with the object and selected from a first display element and a second display element, the display element being displayed such that (i) an entirety of the display element appears spaced apart from the screen surface level in a z-direction substantially perpendicular to the screen surface so as to create an appearance of a gap in the z-direction between the entirety of the display element and the screen surface, and (ii) the display element appears displaced from at least one other display element in an xy plane parallel to the screen surface;
receiving an indication of a transition of the object from the first position towards the touch screen to a second position, wherein the second position indicates the object is substantially in contact with the touch screen surface; and
in response to the indication of the transition of the object,
in an instance in which the first display element that is currently associated with the object appears to float above the screen surface level in the z-direction, causing the first display element to move in the same direction as the object towards the touch screen, and displaying the first display element substantially at the touch screen surface and substantially in contact with the object; and
in an instance in which the second display element that is currently associated with the object appears to float below the screen surface level in the z-direction on an opposite side of the touch screen surface as compared to the position of the object, causing the second display element to move in a direction opposite to the direction of movement of the object towards the touch screen surface, and displaying the second display element substantially at the touch screen surface and substantially in contact with the object.

9. The method of claim 8, further comprises:
causing the display element currently associated with the object to change on the basis of a disparity value dependent on a detected distance.

10. The method of claim 9, wherein the disparity value defines displacement between two images of the display element in x-direction substantially parallel to the screen surface.

11. The method of claim 10, wherein the disparity value is set as zero in response to receiving indication of the transition.

12. The method of claim 8, further comprising:
change a display mode from a three-dimensional mode to a two-dimensional mode in response to detecting the transition.

13. The method of claim 8, further comprising:
receiving indication of a virtual touch of the object to a portion of a display element; and
associate the display element with the object in response to receiving indication of the virtual touch.

14. A computer program product comprising at least one non-transitory computer-readable medium bearing computer-executable program code instructions stored therein, the computer-executable program code instructions comprising program code instructions to:
receive information on presence of an object in a first position and in close proximity to a touch screen surface,
receive an indication of a display element currently associated with the object and selected from a first display element and a second display element, the display element being displayed such that (i) an entirety of the display elements appears spaced apart from the screen surface level in the z-direction substantially perpendicular to the screen surface so as to create an appearance of a gap in the z-direction between the entirety of the display element and the screen surface, and (ii) the display element appears displaced from at least one other display element in an xy plane parallel to the screen surface;
receive an indication of a transition of the object from the first position towards the touch screen to a second position, wherein the second position indicates the object is substantially in contact with the touch screen surface; and
in response to the indication of the transition of the object,
in an instance in which the first display element that is currently associated with the object appears to float above the screen surface level in the z-direction, cause the first display element to move in the same direction as the object towards the touch screen, and display the first display element substantially at the touch screen surface and substantially in contact with the object; and
in an instance in which the second display element that is currently associated with the object appears to float below the screen surface level in the z-direction on an opposite side of the touch screen surface as compared to the position of the object, cause the second display element to move in a direction opposite to the direction of movement of the object towards the touch screen surface, and display the second display element substantially at the touch screen surface and substantially in contact with the object.

15. The apparatus of claim 1, wherein the first display element is displayed such that the display element currently associated with the object appears to float above or below the screen surface level in the z-direction, and wherein the at least one memory and the computer program code are further configured to, with the at least one processor, cause the apparatus to:
receive an indication of a transition of the object from the first position to a third position, wherein the third position indicates that the object is in proximity to the touch screen surface without being in contact with the screen surface, and wherein the third position is displaced from the screen surface by a different distance than the first position; and cause the display element to change in response to receiving the indication of the transition to the third position such that the display element is displayed so as to appear displaced from the screen surface level in the z-direction by a different distance than in response to the object being in the first position.

16. The method of claim 8, wherein the display element currently associated with the object is displayed such that the display element appears to float above or below the screen surface level in the z-direction, and wherein the method further comprises:

receiving an indication of a transition of the object from the first position to a third position, wherein the third position indicates that the object is in proximity to the touch screen surface without being in contact with the screen surface, and wherein the third position is displaced from the screen surface by a different distance than the first position; and causing the display element to change in response to receiving the indication of the transition to the third position such that the display element is displayed so as to appear displaced from the screen surface level in the z-direction by a different distance than in response to the object being in the first position.

\* \* \* \* \*